(12) United States Patent
Kato (10) Patent No.: US 6,598,733 B2
(45) Date of Patent: Jul. 29, 2003

(54) ARTICLE CONVEYOR DEVICE (75) Inventor: Heizaburo Kato, Shizuoka (JP)

(73) Assignee: Sankyo Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/186,096

(22) Filed: Jun. 28, 2002

(65) Prior Publication Data

US 2003/0015404 A1 Jan. 23, 2003

(30) Foreign Application Priority Data

Jul. 23, 2001 (JP) ........................................ 2001-222042

(51) Int. Cl.[7] .............................. G06F 7/00; B65G 25/04; B65G 25/02
(52) U.S. Cl. .................................. 198/750.1; 198/750.8; 198/621.3
(58) Field of Search ........................... 198/750.1, 750, 198/8, 533, 757, 621.3; 700/213, 230

(56) References Cited

U.S. PATENT DOCUMENTS

| 2,029,805 | A | | 2/1936 | Appelberg | |
|---|---|---|---|---|---|
| 3,907,098 | A | * | 9/1975 | Babbitt | 198/621.3 |
| 3,910,422 | A | * | 10/1975 | Zierpka | 198/621.3 |
| 4,329,866 | A | * | 5/1982 | Babbitt | 198/621.3 |
| 4,362,455 | A | * | 12/1982 | Hirose | 198/757 |
| 4,397,174 | A | | 8/1983 | Jungesjo | |
| 4,502,591 | A | * | 3/1985 | Kato et al. | 198/621.2 |
| 4,599,909 | A | * | 7/1986 | Koller | 74/27 |
| 5,345,831 | A | | 9/1994 | Sandrock | |

FOREIGN PATENT DOCUMENTS

| JP | 57121441 | 7/1982 |
|---|---|---|
| JP | 58-006810 | 1/1983 |

OTHER PUBLICATIONS

European Search Report EP 02 25 4566 dated Nov. 18, 2002.

* cited by examiner

*Primary Examiner*—Christopher P. Ellis
*Assistant Examiner*—Gene O Crawford
(74) *Attorney, Agent, or Firm*—Harness, Dickey & Pierce, P.L.C.

(57) ABSTRACT

The article conveyor employs two cams of different configuration. One cam imparts oscillatory motion to an output shaft; whereas the other cam imparts a reciprocating motion. The article conveyor moves in a conveying direction from a first position to a second position and back to the first position. Motion is such that the time taken to move from the first position to the second position is longer than the time taken to move from the second position back to the first position.

9 Claims, 8 Drawing Sheets

PRIOR ART

FIG. 8

ARTICLE CONVEYOR DEVICE

BACKGROUND OF THE INVENTION

The present application claims priority upon Japanese Patent Application No. 2001-222042 filed on Jul. 23, 2001, which is herein incorporated by reference.

1. Field of the Invention

The present invention is related to an article conveyor device. In particular, the present invention relates to an article conveyor device having an input shaft supported movably to a housing, an output shaft supported movably in respect to the housing, a first cam to oscillate the output shaft by cooperating with the input shaft, and a second cam different to the first cam, to reciprocate the output shaft by cooperating with the input shaft, and an article conveyor portion which oscillates and reciprocates with the output shaft.

2. Related Art

Conventionally, there has been proposed various devices to convey and align articles such as so-called unpackaged parts, and to feed them one by one. These devices are generally referred to as a "parts feeder". There are various types of parts feeders such as a vibratory type, a rotating type, an oscillating type, a belt type, and a shaking type, in which a vibratory parts feeder is the most common. This vibratory parts feeder is a device where articles to be conveyed are placed on a vibrating surface, and by use of a relative slip and jump phenomenon between them, alignment and conveying of the articles are performed.

Figure 8:
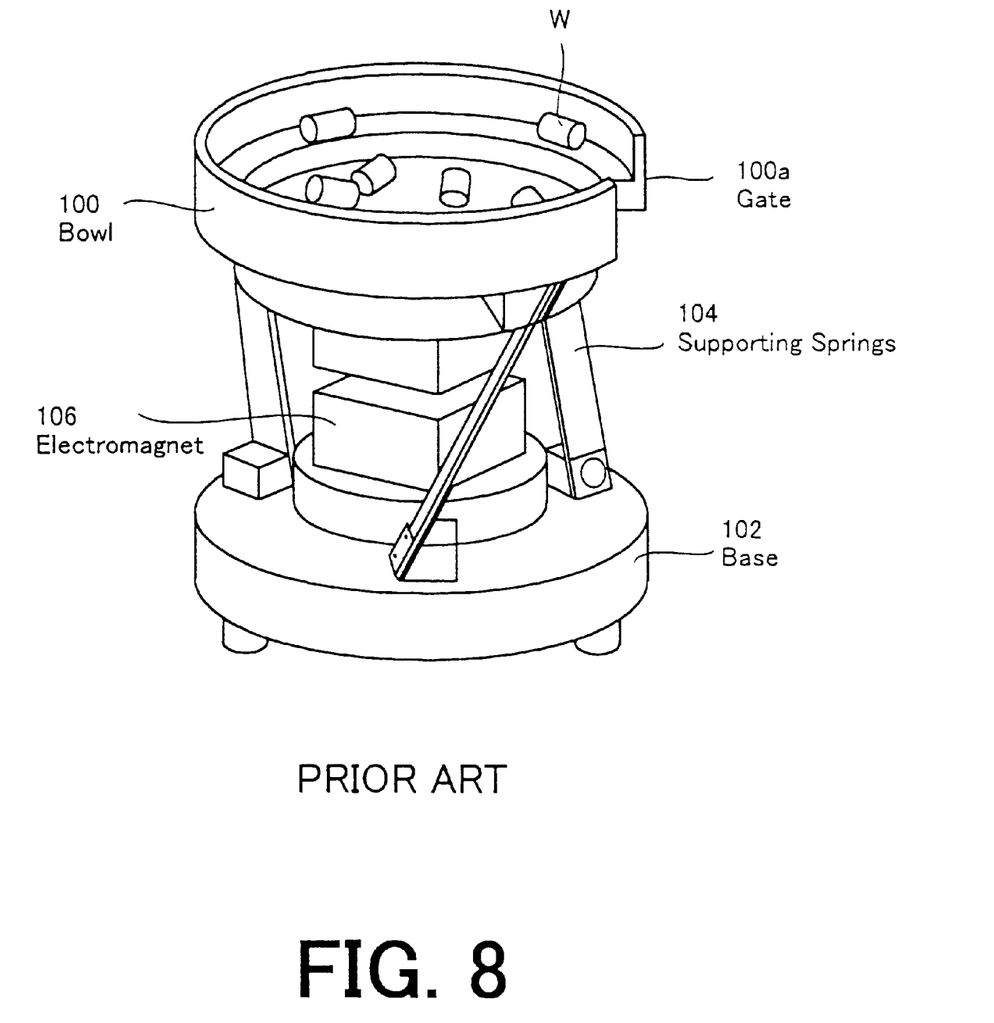
FIG. 8 is a diagram showing a structure of a conventional vibratory parts feeder.

An exemplary structure of a vibratory parts feeder is described referring to FIG. 8. As shown in FIG. 8, a bowl 100 is supported in a state biased by a few pairs of supporting springs 104 in respect to a base 102. Further, the base 102 is provided with an electromagnet 106, and the bowl 100 may be drawn near by this electromagnet 106. Therefore, if an alternating voltage with a predetermined frequency is applied to the electromagnet 106, the bowl 100 vibrates according to the frequency. In this way, the article (work) W accommodated in the bowl 100 is appropriately aligned and conveyed and fed from a gate 100a one by one.

However, a vibratory parts feeder having such a structure has various problems. For example, the problems are such as a lot of time in adjustment, magnetization of work, and generation of noise. In particular, regarding noise, in the case of a vibratory parts feeder with the above described structure, the work is made to jump in respect to the bowl 100 and conveyed, thus noise is generated when the work lands on the bowl 100.

In view of the above problems, there is proposed a vibratory parts feeder using a cam, for example, such as that shown in Japanese Unexamined Patent Publication No. Sho 58-6810 (Japanese Examined Patent Publication No. Sho 63-24891). A device described therein has a bowl supported rotatably about a center shaft. The bowl is rotated while horizontally vibrated by a cam so that a significant difference in accelerations for back and forth strokes exists, so as to convey the work inside it using friction force and inertial force.

In this device, since a cam is used, and the bowl horizontally oscillates and does not reciprocate in an up-and-down direction, the work does not jump on the bowl, and thus this device is advantageous in that a conventional problem regarding noise may be eased. However, since with this device the bowl horizontally oscillates and does not reciprocally move in the up-and-down direction as described above, the work on the bowl is always contacted toward the bowl with a predetermined force by gravity.

In order to efficiently convey the work in the bowl, it is preferable for a contact pressure of the work in respect to the bowl to vary depending on a direction of the bowl movement, i.e., in the case the bowl moves in the conveying direction of the work, and in the case the bowl moves in an opposite direction to the above. In other words, it is preferable at the time the bowl moves in the conveying direction of the work, to make the work contact against the bowl with a stronger force, to suppress slipping of the work in respect to the bowl and to actively convey the work, whereas, it is preferable at the time the bowl moves in an opposite direction to a conveying direction of the work, to make the work contact against the bowl with a slighter force, to encourage the work to slip in respect to the bowl and to suppress the work from returning to an opposite direction of the conveying direction of the work.

SUMMARY OF THE INVENTION

In view of the above problems, one object of the present invention is to provide an effective article conveyor device having a first cam, and a second cam different to the first cam.

One aspect of the present invention for achieving the above and other objects is an article conveyor device conveying an article, comprising:

an input shaft movably supported in respect to a housing;

an output shaft movably supported in respect to the housing;

a first cam to make the output shaft oscillate by cooperating with the input shaft;

a second cam different to the first cam, to make the output shaft perform a reciprocating motion by cooperating with the input shaft; and an article conveyor portion oscillating and performing a reciprocating motion with the output shaft.

For example, the first cam may be a roller gear cam, the output shaft may be provided with a plurality of cam followers contacting the roller gear cam, and the roller gear cam and the cam followers may constitute a roller gear cam mechanism.

The output shaft may be provided with a contacting portion contacting the second cam, and the contacting portion may be contacting a peripheral surface of the second cam as biased towards the input shaft by the biasing member.

At the time the output shaft is oscillated by the first cam, the contacting portion may slide in respect to the second cam as contacting the second cam.

The output shaft may be provided with a concave engaging portion which engages the second cam, and the engaging portion may be engaged with the second cam of the input shaft.

At the time the article conveyor portion is oscillated by the first cam, the engaging portion may slide in respect to the second cam as engaged with the second cam.

The oscillation may be in a horizontal direction, and the reciprocating motion may be in a vertical direction.

At the time the article conveyor portion is oscillated to move from a first position in a conveying direction of an article to a second position, and to move from the second position to an opposite direction in a conveying direction of the article to the first position, a time taken for the article conveyor portion to move from the first position to the second position may be longer than a time taken for the article conveyor portion to move from the second position to the first position.

In an oscillating motion of the article conveyor portion, the article conveyor portion may perform constant speed travel for a predetermined time, during a time period since movement of an article in a conveying direction is started until the movement is ended.

At the time a speed of the article conveyor portion directed upwards is increasing, the article conveyor portion may perform the constant speed traveling in an oscillating motion.

At the time the article conveyor portion is moving in a direction opposite to a conveying direction of an article in an oscillating motion, a speed of the article conveyor portion directed downwards may increase.

BRIEF DESCRIPTION OF THE DRAWINGS

Embodiments of the present invention will now be described by way of further example only and with reference to the accompanying drawings, in which.

DETAILED DESCRIPTION OF PREFERRED EMBODIMENTS

Figure 1:
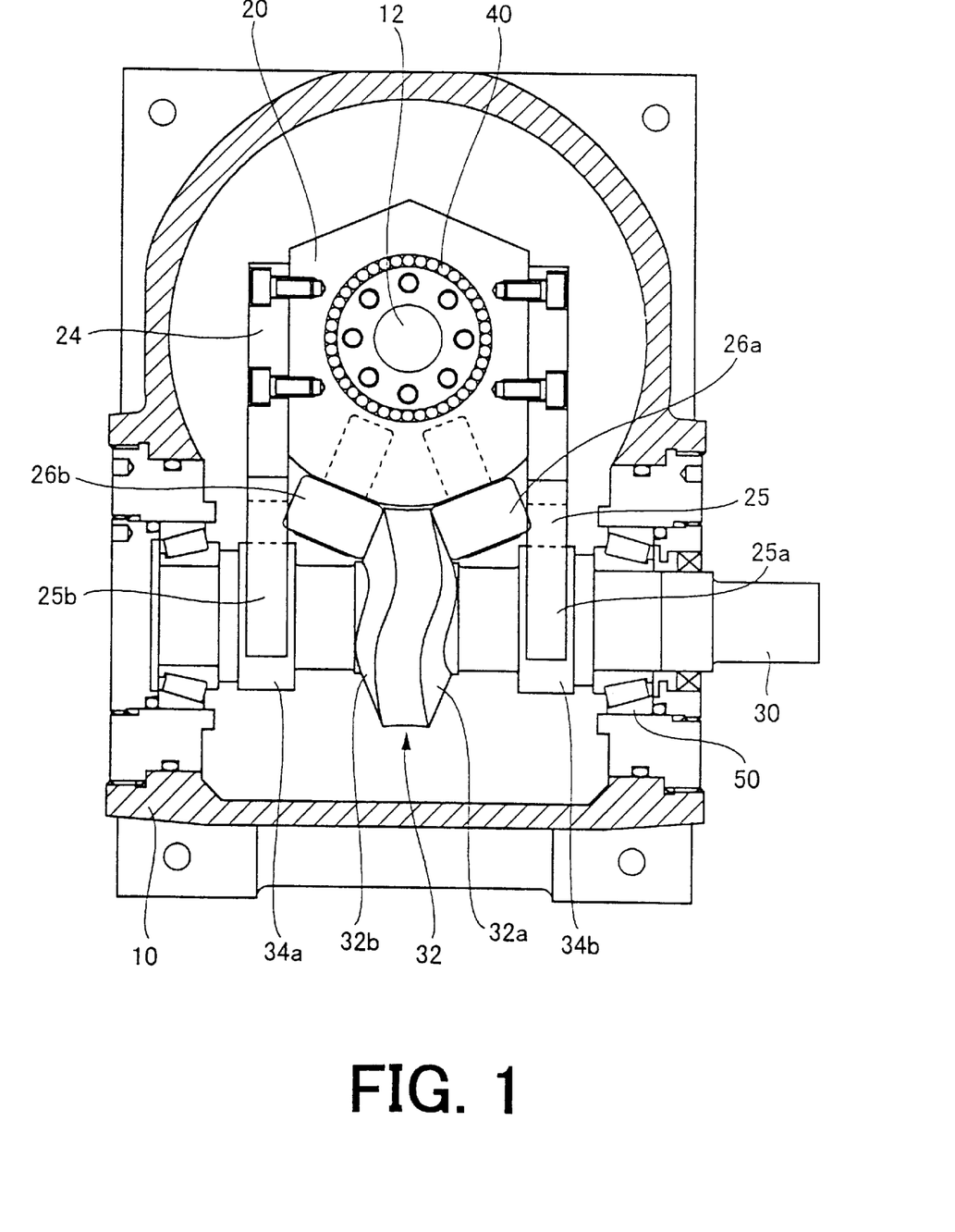
FIG. 1 is a transverse cross sectional view of a device.
Figure 2:
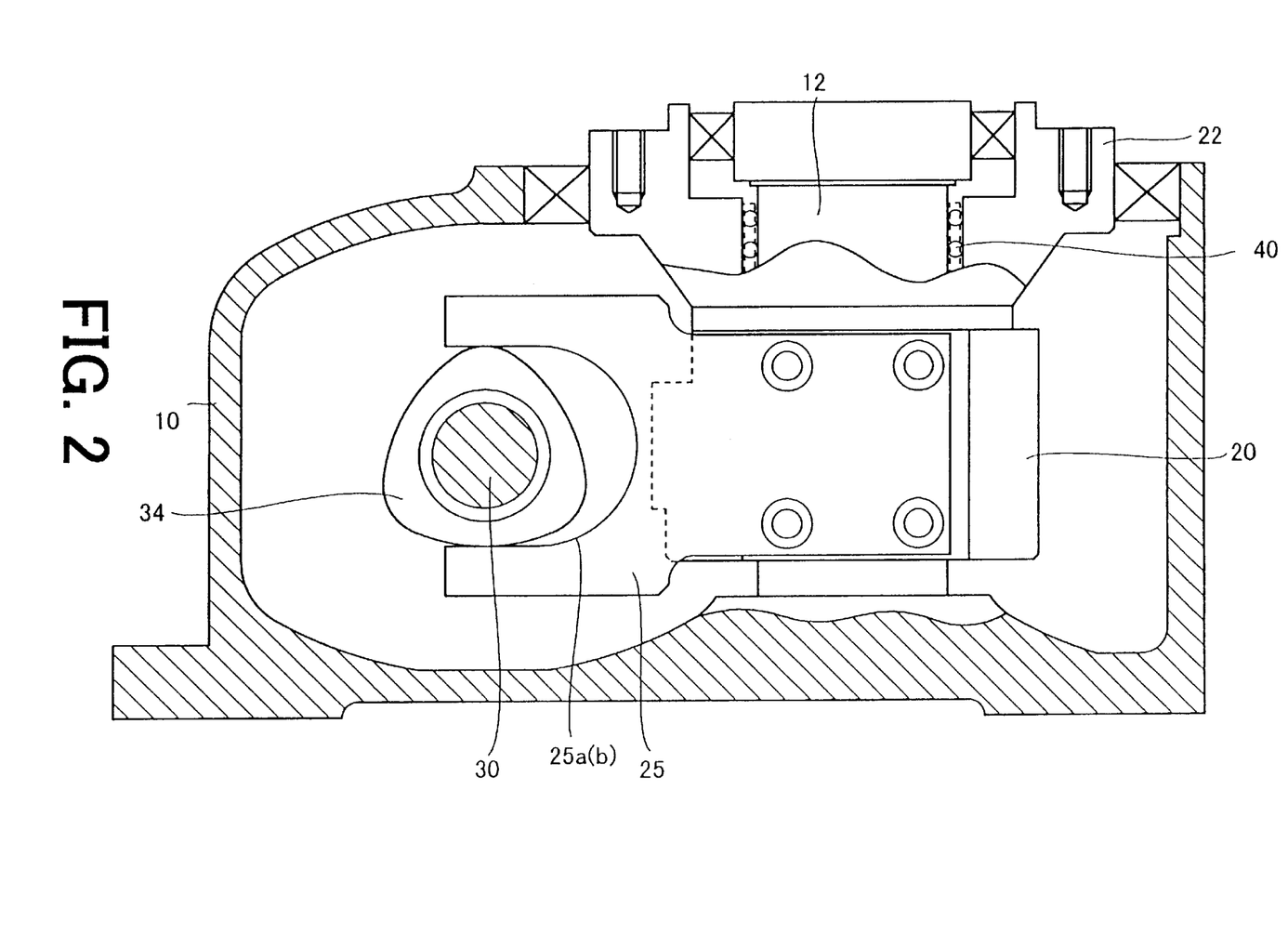
FIG. 2 is a vertical sectional view of the device.
Figure 3:
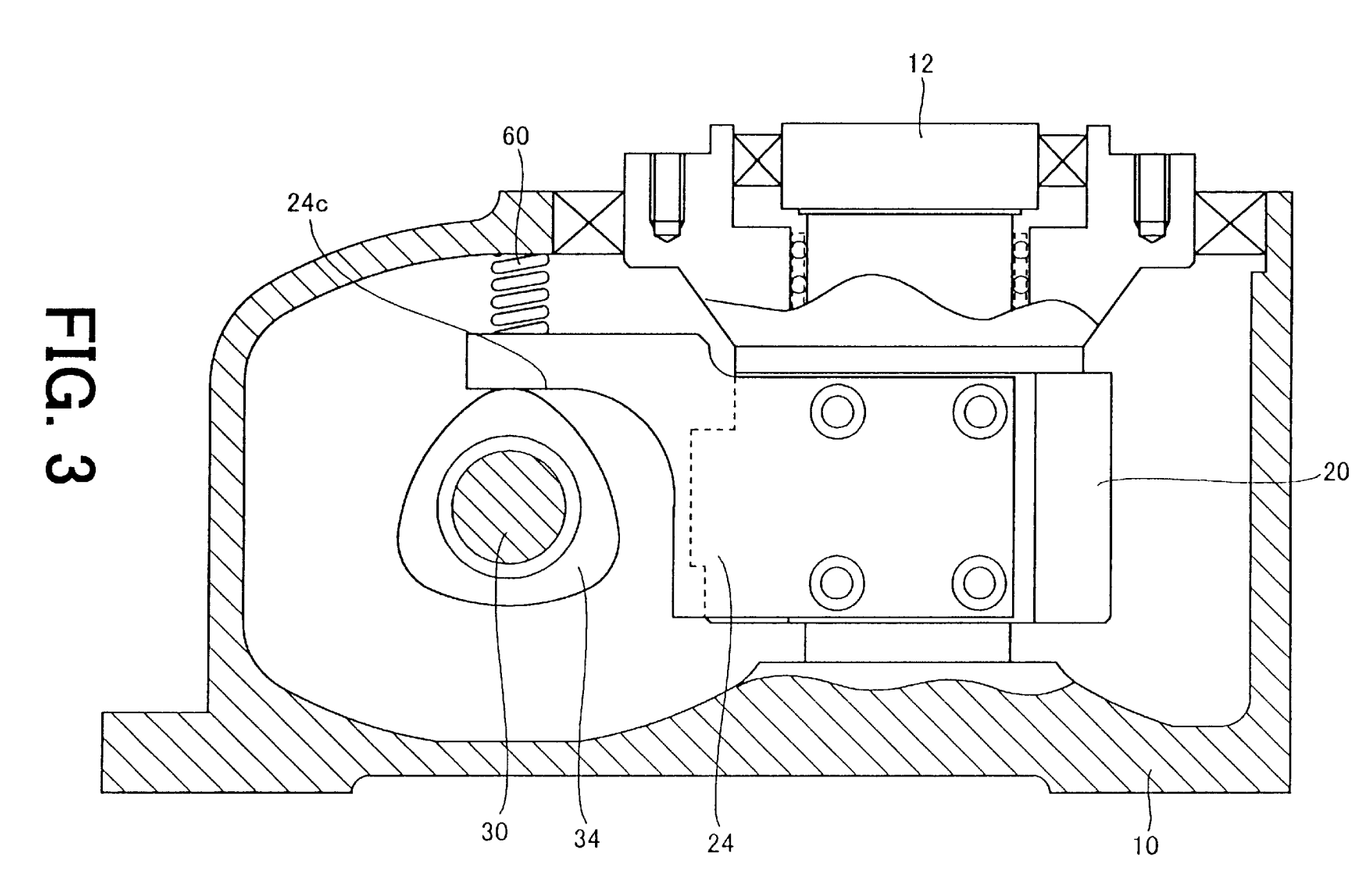
FIG. 3 is a vertical sectional view of a modification of the device.
Figure 4:
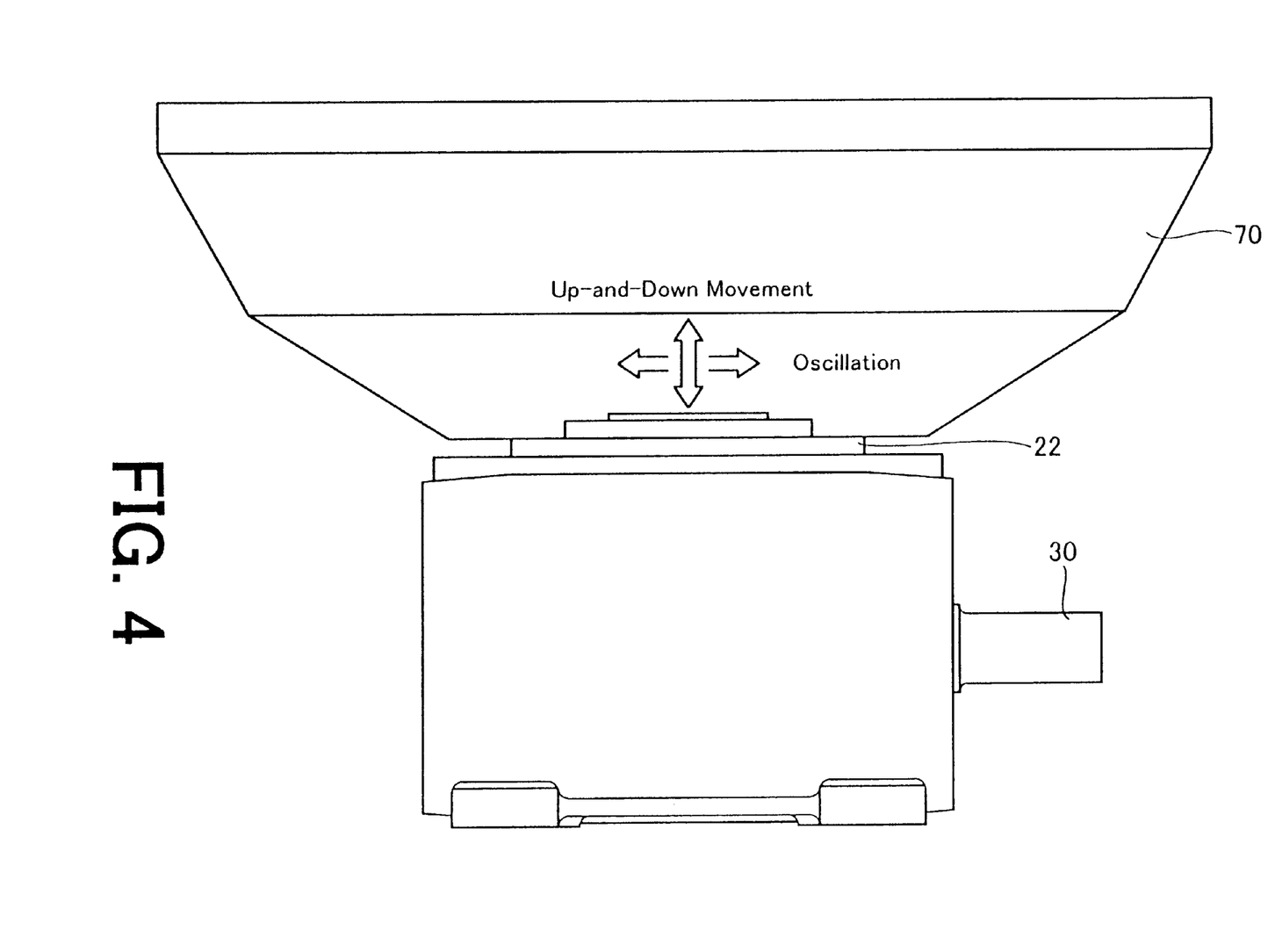
FIG. 4 is a diagram showing a structure of an article conveyor device.
Figure 5:
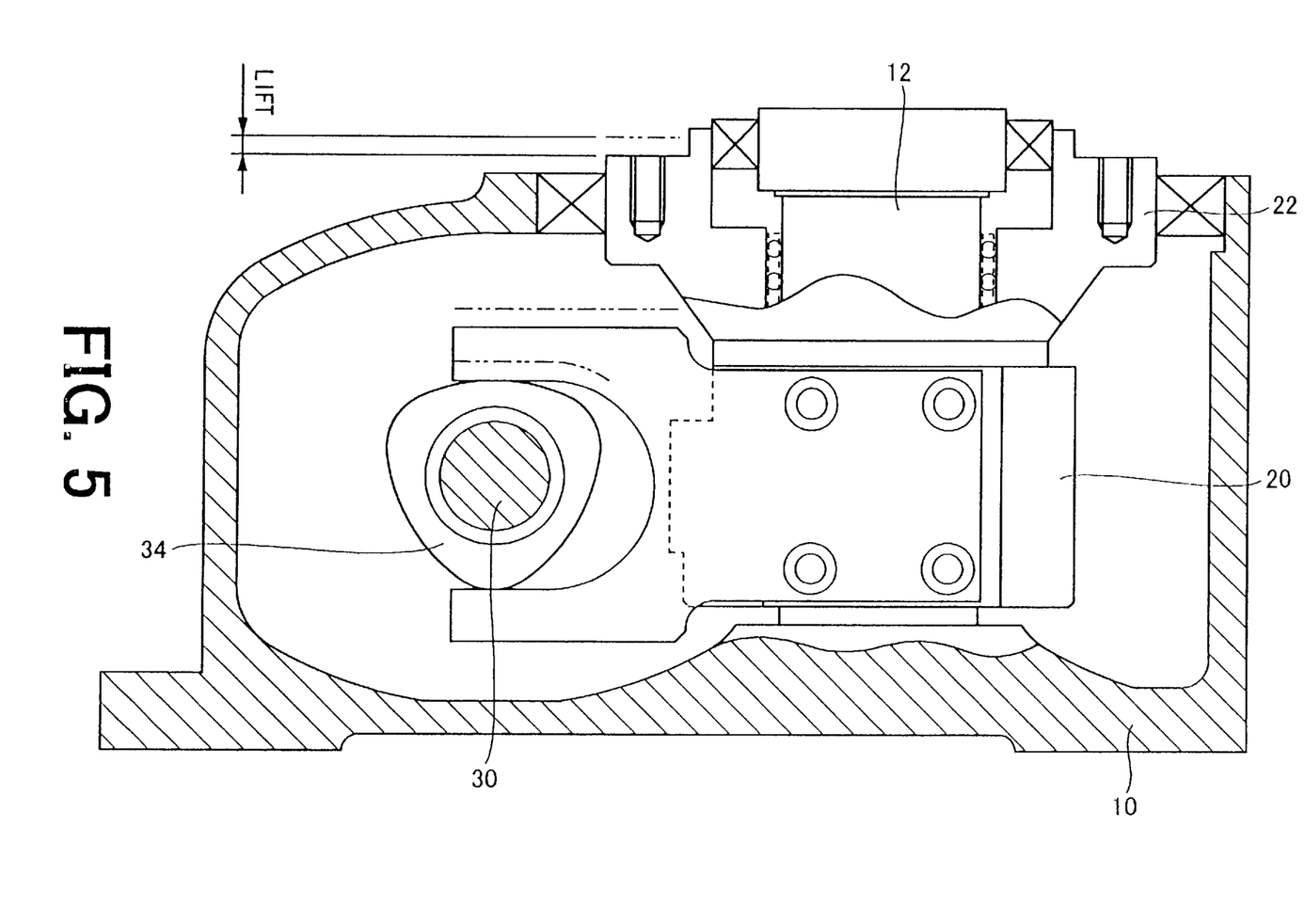
FIG. 5 is a diagram explaining a reciprocating motion of the device.
Figure 6:
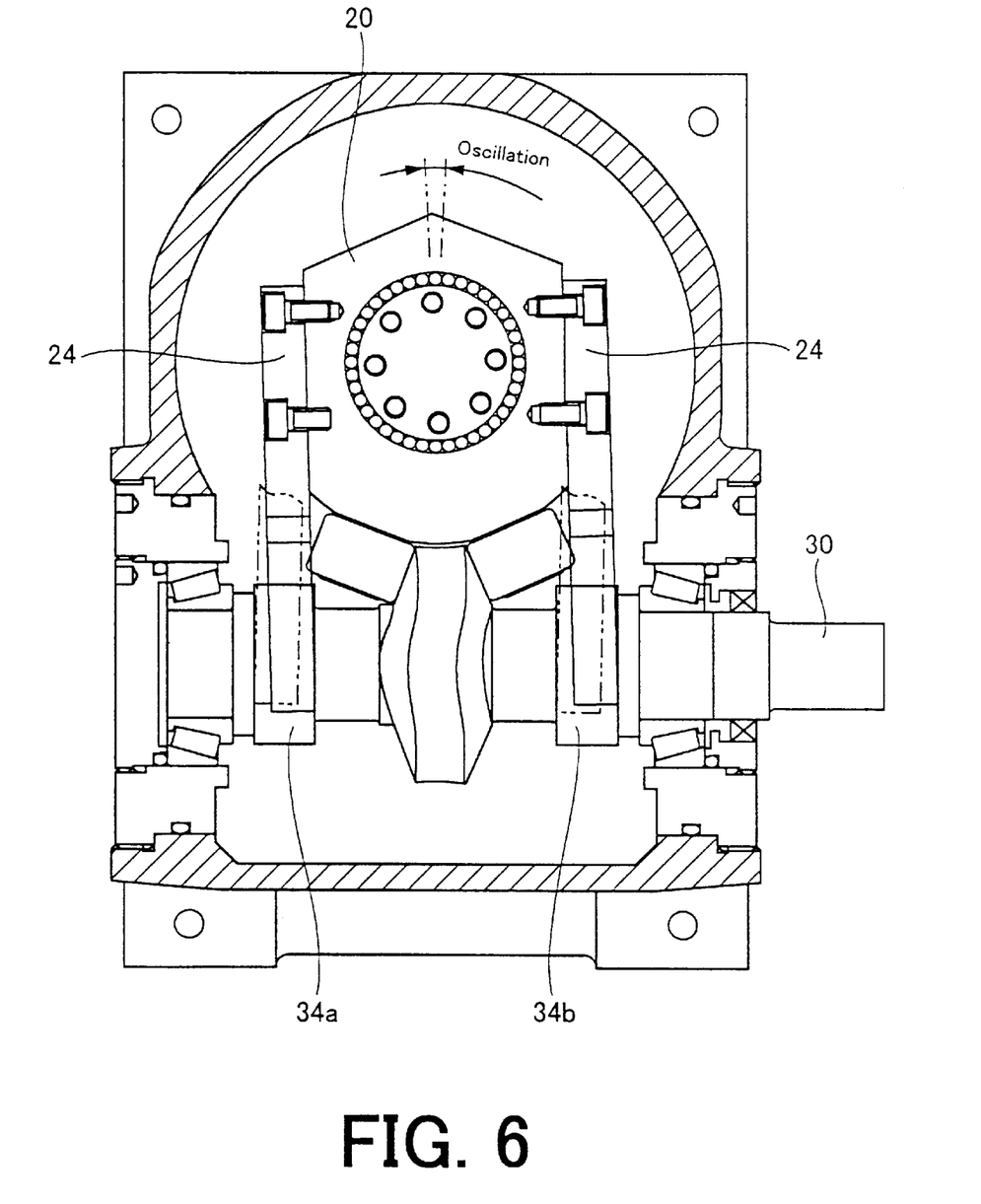
FIG. 6 is a diagram explaining an oscillating motion of the device.

A structure of an article conveyor device according to the present invention is explained referring to FIGS. 1, 2, 3, 4, 5 and 6. FIG. 1 is a transverse cross section of the device, and FIG. 2 is a vertical section of the device. FIG. 3 is a vertical section of a modification of the device. FIG. 4 is a diagram showing a structure of the article conveyor device. FIG. 5 is a diagram for explaining a reciprocal motion of the device. FIG. 6 is a diagram for explaining the oscillating motion of the device.

An input shaft 30 is rotatably supported by a housing 10 via an input shaft bearing 50, and is driven and rotated by a drive source such as a motor which is not shown.

An output shaft 20 is rotatably and slidably supported by an output shaft supporting portion 12 provided in the housing 10 via an output shaft bearing 40. Further, the output shaft supporting portion 12 may be formed integrally with the housing 10, or may be manufactured as a separate part, and then fixed to the housing 10 by means such as screw fastening.

The input shaft 30 is provided with a first cam 32 to oscillate an output shaft 20 by cooperating with the input shaft 30, and a second cam 34 different to the first cam 32 to reciprocate the output shaft 20 by cooperating with the input shaft 30. When the input shaft 30 rotates, the first cam 32 and the second cam 34 rotate with the input shaft 30.

The first cam 32 is provided with an eleventh cam surface 32a, and a twelfth cam surface 32b different to the eleventh cam surface 32a, along a rotating direction of the input shaft 30. Further, the output shaft 20 is provided with a first cam follower 26a corresponding to the eleventh cam surface 32a, and a second cam follower 26b different to the first cam follower 26a corresponding to the twelfth cam surface 32b.

As can be seen, the first cam 32 is a roller gear cam, and the output shaft 20 is provided with a plurality of cam followers (the first cam follower 26a and the second cam follower 26b) which contact the roller gear cam, and the roller gear cam and cam followers constitute a roller gear cam mechanism.

Since the roller gear cam is constituted in this way, by adjusting a distance between the input shaft 30 and the output shaft 20, a contacting state of the cam surface and the cam followers is adjusted to create a pre-compression state where backlash can be avoided. Therefore, with a simple mechanism, the cam device provided in the article conveyor device may be made faster, with higher precision, and greater rigidity.

Further, when the first cam 32 rotates the output shaft 20 in a predetermined direction, the eleventh cam surface 32a presses the first cam follower 26a, and at this time, the first cam follower 26a is inhibited from detaching, i.e. jumping from the eleventh cam surface 32a by the twelfth cam surface 32b and the second cam follower 26b, and when the first cam 32 rotates the output shaft 20 to an opposite direction of a predetermined direction, the twelfth cam surface 32b presses the second cam follower 26b, and at this time, and at this time the second cam follower 26b is inhibited from detaching, i.e. jumping from the twelfth cam surface 32b by the eleventh cam surface 32a and the first cam follower 26a.

The second cam 34 is formed with a cam surface at its peripheral surface along the rotation direction of the input shaft 30. Further, the output shaft 20 is provided at a tip portion with a lifting arm 24 having a concave engaging portion 25. The engaging portion 25 engages with a peripheral surface of the second cam 34. In this way, the output shaft 20 is certainly reciprocally driven due to the cam surface of the second cam 34. From a state shown in FIG. 2, a state where the input shaft 30 has rotated approximately 60 degrees is shown in FIG. 5. As can be clearly seen from FIG. 5, when the input shaft 30 rotates approximately 60 degrees, the output shaft 20 is lowered a predetermined amount in respect to the housing 10. Further, when the input shaft 30 rotates approximately another 60 degrees from the state shown in FIG. 5, the output shaft 20 is raised to a state shown in FIG. 2.

Further, as shown in FIG. 6, at the time the output shaft 20 is oscillated by the first cam 32, the engaging portion 25 oscillates in respect to the second cam 34 in an engaged state with the second cam 34. Therefore, with the oscillation of the output shaft 20, the action of a reciprocating motion of the output shaft 20 by the second cam 34 is not impaired.

Further, as shown in FIG. 3, a contacting portion 25c is provided contacting the second cam 34 at the tip portion of the lifting arm 24, and the contacting portion 25c may be made to contact the second cam 34 in a state biased in the direction of the input shaft 30 by a biasing member 60 such as a spring, radially and inwardly to input shaft 30. Further, also in this case, at the time the output shaft 20 is made to oscillate by the first cam 32, the contacting portion 25c oscillates in respect to the second cam 34 in a state contacting the second cam 34. Therefore, with the oscillation of the output shaft 20, a reciprocating motion of the output shaft 20 by the second cam 34 is not impaired.

In this way, it is possible to use a structure shown in FIG. 3 in place of a structure shown in FIG. 2, but the structure of FIG. 2 is advantageous in that, while the input shaft 30 rotates once, the output shaft 20 can be oscillated and moved up and down a plurality of times, and further jumping of the engaging portion 25 in respect to the second cam 34 may be inhibited.

On the other hand, in the structure shown in FIG. 2, the shape of the second cam 34 yield to a certain restriction in order to engage the peripheral surface of the second cam 34 to the engaging portion 25, but in the structure shown in FIG. 3 is advantageous in that there is no such restriction.

Further, in this embodiment, the lifting arm 24 was screwed to the output shaft 20, however the lifting arm 24 maybe integrally formed with the output shaft 20.

The second cam 34 has a twenty-first cam surface 34a, and a twenty-second cam surface 34b different to the twenty-first cam surface 34a. The engaging portion 25 is provided with a first engaging portion 25a, and a second engaging portion 25b different to the first engaging portion 25a. The twenty-first cam surface 34a and the first engaging portion 25a, and the twenty-second cam surface 34b and the second engaging portion 25b are provided at opposite sides from each other in respect to a rotation axis of the output shaft 20. Therefore, a reciprocating motion of the output shaft 20 by the second cam 34 may be certainly performed.

Further, the output shaft 20 has an output flange 22 at its end portion in the direction of its rotation axis, and the output flange 22 is attached with a bowl which functions as an article conveyor portion 70. Therefore, when the input shaft 30 is rotationally driven, the bowl oscillates and reciprocates with the output shaft 20. Further, the oscillation is in a horizontal direction, and the reciprocating motion is in a vertical direction, so that an article accommodated in the bowl can be conveyed by using the action of gravity. Further, since the structure of the bowl is similar to that known conventionally, a detailed explanation will not be given.

Operation of Device According to the Embodiment

Figure 7A:
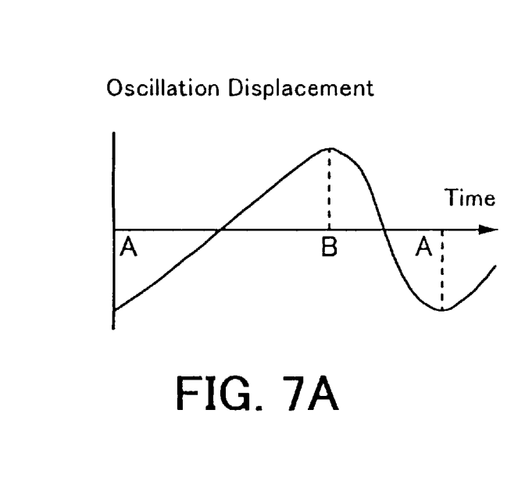
FIGS. 7A–7F are timing charts of the oscillation and reciprocating motion.
Figure 7B:
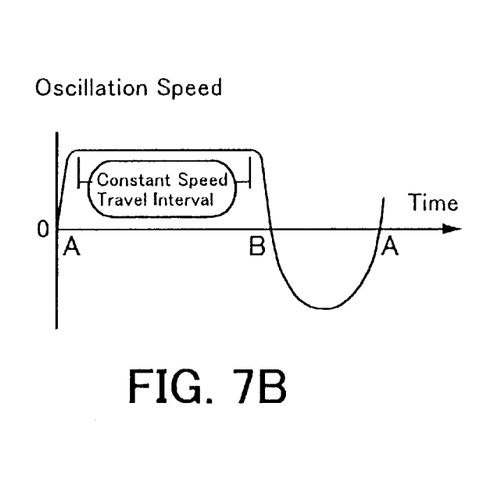
Figure 7C:
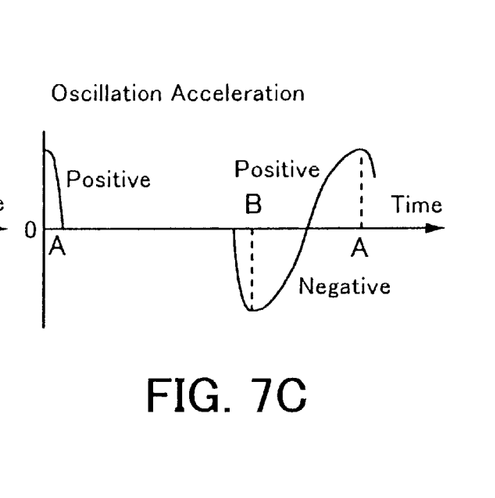
Figure 7D:
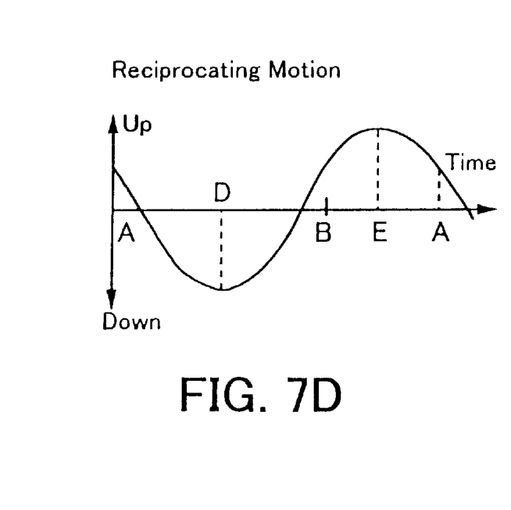
Figure 7E:
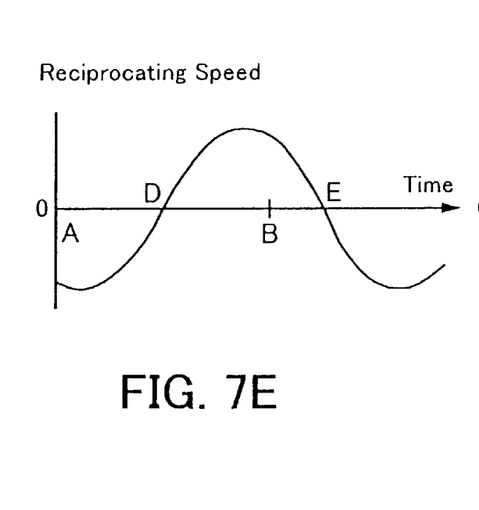
Figure 7F:
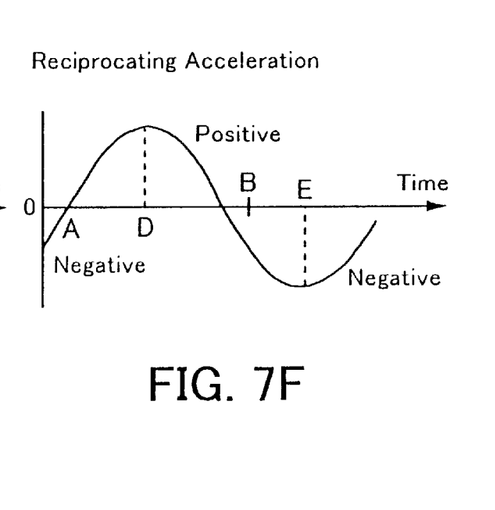

An operation of the article conveyor device according to this embodiment is described in FIGS. 7A–7F. FIGS. 7A–7F are timing charts of oscillation and reciprocating motion. The timing charts in the upper half, FIGS. 7A–7C, show, from the left in order, a relationship between an oscillation displacement and time, a relationship between an oscillation speed and time, a relationship between an oscillation acceleration and time, respectively. The timing charts in the lower half, FIGS. 7D–7F, show, in order from the left, a relationship between an up-and-down motion displacement and time, a relationship between an up-and-down motion speed and time, a relationship between an up-and-down motion acceleration and time, respectively. The time axis of the three drawings in the upper half and the three drawings in the lower half match the respective drawings above and below.

As described above, when the first cam 32 and the second cam 34 rotate, the output shaft 20 and the bowl attached to the output shaft 20 oscillate and reciprocate. First, the oscillating motion is described. As shown in FIGS. 7A–7C, the bowl oscillates from a point A in an article conveying direction to a point B, and from point B moves in an opposite direction to the article conveying direction to point A. In other words, the bowl performs oscillation between point A and point B in a horizontal direction.

At this time, a time taken for a bowl to move from point A to point B is longer than a time taken for a bowl to move from point B to point A. Therefore, it becomes possible to actively convey the article. This is because by increasing the time for the bowl to move the article in a conveying direction, acceleration in the conveying direction of the bowl may be suppressed, so that slip of the article in the bowl in respect to the bowl does not easily occur. On the contrary, at the time the bowl moves to an opposite direction to that of the conveying direction of the article, a sudden movement is performed so that acceleration is increased, and slip of the article on the bowl may easily occur in respect to the bowl.

Further, as shown in FIG. 7B, in the oscillating motion of the bowl, during the time period since movement of the article starts from point A until it reaches point B, the bowl travels at a constant speed for a predetermined time. When the bowl is performing a constant speed movement, a force caused by acceleration of the article conveyor portion 70 does not apply to the article supported on the bowl, thus the article does not slip in respect to the bowl. Therefore, at least while the bowl is performing a constant speed traveling, slipping of the article may be suppressed.

Next, a reciprocating motion of the bowl in the up-and-down direction (vertical direction) is described. As shown in FIGS. 7D–7F, when the bowl is positioned at point A, the bowl is being lowered. The bowl is further lowered and reaches a point D which is a lowest point. When the bowl reaches point D, then it rises and reaches a point E which is a highest point. In this way, the bowl performs a reciprocating motion in the up-and-down direction between point D and E.

Next, a relationship between oscillation and reciprocating motion is described. As shown in FIGS. 7A–7F, when the speed of the article conveyor portion 70 directing upwards is increasing, that is when acceleration of the reciprocating motion is positive, the article conveyor portion 70 performs constant speed travel in the oscillating motion in a horizontal direction. Here when the speed of the article conveyor portion 70 directed upwards is increasing, the article on the article conveyor portion 70 is pressed against the article conveyor portion 70. Further, when the article conveyor portion 70 is performing a constant speed travel in an oscillating motion in a horizontal direction, a force applying to the article in a horizontal direction resulting from acceleration of the article conveyor portion 70 is not generated. Therefore, in the above case, it is possible to certainly suppress slipping of the article in respect to the article conveyor portion 70.

Further, in the oscillating motion of the article conveyor portion 70, at the time the article conveyor portion 70 is moving to an opposite direction to the conveying direction of the article, a speed of the article conveyor portion 70 directed downwards increases, that is, the reciprocating motion acceleration becomes negative. Here, when the speed of the article conveyor portion 70 directed downwards is increasing, the contact pressure between the article on the article conveyor portion 70 and the article conveyor portion 70 decreases, and the friction force decreases, so that the article easily slips on the article conveyor portion 70. Therefore, in the oscillating motion of the article conveyor portion 70, at the time the article conveyor portion 70 is moving to an opposite direction to the conveying direction of the article, the speed of the article conveyor portion 70 directed downwards increases so that the article slips in respect to the article conveyor portion 70, and thus movement to an opposite direction to the article conveying direction is suppressed, and as a result the article may be satisfactorily conveyed in the conveying direction.

Furthermore, at the time of lowering the bowl in the reciprocating motion in the up-and-down direction as described above, the maximum acceleration of the bowl is preferably in a range in which the article on the bowl does not bound in respect to the bowl. With the maximum acceleration set in such a range, generation of noise due to the article jumping on the bowl may be prevented.

In the timing charts as described above, the time taken for the bowl to move from point A to point B is made longer than the time taken for the bowl to move from point B to point A, and in the oscillation motion of the bowl, the bowl is made to travel at a constant speed for a predetermined time, from the time the movement of the article is started from point A until it reaches point B. However, a common timing chart, that is, a timing chart with a sine curve where time taken for the bowl to move from point A to point B is the same as the time taken for the bowl to move from point B to point A, may also be used.

Even with such a common timing chart, since this embodiment is provided with a first cam 32 and a second cam 34 different to the first cam 32, by these two cams, the oscillation motion and the up-and-down motion may respectively be set freely (independently). Therefore, by appropriately setting the shape of the first cam 32 and the second cam 34 in accordance with the use conditions, an effective article conveyor may be realized.

According to this embodiment, an oscillation and a reciprocating motion of the article conveyor portion are performed by separate cams. In other words, the oscillation of the article conveyor portion is performed by the first cam, and the reciprocating motion of the article conveyor portion is performed by the second cam, respectively. Thus, the respective motions of oscillation and the reciprocating motion may be optimized. Furthermore, since the first cam and the second cam both cooperate with the input shaft, it becomes possible to accurately match the timing of the oscillation and the reciprocating motion of the article conveyor portion. Thus, a reliable article conveyance becomes possible. Furthermore, generation of noise which was a conventional problem may also be suppressed.

Further, the first cam is a roller gear cam, and the output shaft is provided with a plurality of cam followers contacting the roller gear cam, and since the roller gear cam mechanism is constituted by the roller gear cam and cam followers, the oscillation of the article conveyor portion may be certainly performed.

The contacting portion provided in the output shaft contacts the peripheral surface of the input shaft in a state biased to a direction of an input shaft by a biasing member, so that a reciprocating motion of the article conveyor portion may be certainly performed.

At the time the article conveyor portion is oscillated by the first cam, the contacting portion slides in respect to the second cam in a state contacting the second cam, so that the action of a reciprocating motion of the article conveyor portion by the second cam is not impaired by the article conveyor portion oscillating.

Since the concave engaging portion provided in the output shaft is engaged with the peripheral surface of the input shaft, the reciprocating motion of the output shaft may be certainly performed. Therefore, the reciprocating motion of the article conveyor portion which oscillates and performs reciprocation motions with the output shaft, may be certainly performed.

At the time the article conveyor portion is oscillated by the first cam, the engaging portion slides in respect to the second cam in a state engaged to the second cam, so that at the time the article conveyor portion is oscillated, a reciprocating motion of the article conveyor portion by the second cam is not impaired.

The oscillation is in a horizontal direction, and the reciprocating motion is in a vertical direction, thus the article may be efficiently conveyed using the action of gravity.

A time taken for the article conveyor portion to move in a conveying direction of the articles is longer than a time taken to move in an opposite direction to the conveying direction of the articles. Therefore, it becomes possible to certainly convey the article.

While the article conveyor portion is performing constant speed traveling, force applied to an article resulting from acceleration of the article conveyor portion is not generated against the article supported on the article conveyor portion, thus the article does not slip in respect to the article conveyor portion. Therefore, it becomes possible to accurately convey the article.

When the speed of the article conveyor portion directed upwards is increasing, the article on the article conveyor portion is pressed against the article conveyor portion, and a contact pressure between the article on the article conveyor portion and the article conveyor portion increases, and a friction force increases. Therefore, in this case, if the article conveyor portion performs constant speed traveling in the oscillating motion, the slip of the article in respect to the article conveyor portion maybe suppressed, and as a result the article may be surely conveyed in the conveying direction.

In the case the speed of the article conveyor portion directed downwards is increasing, the contact pressure between the article on the article conveyor portion and the article conveyor portion decreases, and the friction force decreases, so that the article easily slips on the article conveyor portion. Therefore, in the oscillating motion of the article conveyor portion, at the time the article conveyor portion is moving to an opposite direction to a conveying direction of the article, with the speed of the article conveyor portion directed downwards increasing, the article slips in respect to the article conveyor portion and it is suppressed from moving to an opposite direction to the article conveying direction, and as a result the article may be satisfactorily conveyed in the conveying direction.

While the present invention has been described in detail by way of illustrative and exemplary embodiments thereof, it will be apparent to those skilled in the art to make various alterations and modifications of the invention set forth herein, without departing from the spirit of the invention. Therefore, all such alterations and modifications are construed to be included within the scope of the present invention, except insofar as limited by the prior art.

What is claimed is:

1. An article conveyor device for conveying an article, comprising:

an input shaft movably supported in respect to a housing;

an output shaft movably supported in respect to said housing;

a first cam for oscillating said output shaft by cooperating with said input shaft;

a second cam different to said first cam, for reciprocating said output shaft by cooperating with said input shaft; and an article conveyor portion oscillating and reciprocating with said output shaft;

wherein said oscillation is in a horizontal direction and said reciprocating is in a vertical direction;

wherein the article conveyor portion is configured to effect oscillatory movement in a conveying direction from a first position to a second position and thereafter in direction opposite to the conveying direction from said second position to said first position, and wherein said oscillatory movement being such that the time taken for said article conveyor portion to move from said position to said second position is longer than the time taken for the article conveyor portion to move from said first position.

2. An article conveyor device as claimed in claim 1, wherein said first cam is a roller gear cam, said output shaft is provided with a plurality of cam followers contacting said roller gear cam, and said roller gear cam and said cam followers constitute a roller gear cam mechanism.

3. An article conveyor device as claimed in claim 1, wherein in an oscillating motion of said article conveyor portion, said article conveyor portion performs constant speed travel for a predetermined time, during a time period since movement of an article in a conveying direction is started until the movement is ended.

4. An article conveyor device as claimed in claim 1, wherein at the time a speed of said article conveyor portion directed upwards is increasing, said article conveyor portion performs said constant speed travel in an oscillating motion.

5. An article conveyor device as claimed in claim 1, wherein at the time said article conveyor portion is moving in a direction opposite to a conveying direction of an article in an oscillating motion, a speed of said article conveyor portion directed downwards increases.

6. An article conveyor device as claimed in claim 1, wherein said output shaft is provided with a contacting portion for contacting said second cam, and said contacting portion is contacting a peripheral surface of said second cam as biased toward said input shaft by a biasing member.

7. An article conveyor device as claimed in claim 6, wherein at the time said output shaft is oscillated by said first cam, said contacting portion slides in respect to said second cam as contacting said second cam.

8. An article conveyor device as claimed in claim 1, wherein said output shaft is provided with a concave engaging portion which engages said second cam, and said engaging portion is engaged with said second cam of said input shaft.

9. An article conveyor device as claimed in claim 8, wherein at the time said article conveyor portion is oscillated by said first cam, said engaging portion slides in respect to said second cam as engaged with said second cam.

* * * * *